April 13, 1965     L. A. METHENY     3,177,720

CONTROL APPARATUS HAVING TEMPERATURE COMPENSATING MEANS

Filed May 2, 1960

INVENTOR.
LOWELL A. METHENY
BY

AGENT

United States Patent Office 3,177,720
Patented Apr. 13, 1965

3,177,720
CONTROL APPARATUS HAVING TEMPERATURE
COMPENSATING MEANS
Lowell A. Metheny, South Bend, Ind., assignor to The
Bendix Corporation, a corporation of Delaware
Filed May 2, 1960, Ser. No. 26,017
5 Claims. (Cl. 73—362.4)

This invention, in general, relates to temperature responsive control apparatus wherein a movable output member is positioned as a function of a variable temperature input signal and in particular to temperature sensing apparatus which utilizes a variable volume liquid filled bellows connected at its movable end to actuate a movable output member and connected interiorly to a liquid filled temperature probe by a liquid filled capillary tube.

In temperature responsive control apparatus of the abovementioned type, the liquid filled bellows may be contained in a housing in which fluid such as liquid fuel in the case of a fuel control system for an internal combustion engine or air in the case of a pneumatic system circulates around the liquid filled bellows. The temperature of the surrounding fluid as well as the temperature to which the probe is subjected results in corresponding variations in the temperature and thus the volume of the liquid filling the bellows which, in turn, causes corresponding movement of the movable end of the bellows and thus the movable output member. Therefore, the temperature of the fluid surrounding the bellows, unless compensated for, introduces an error in the response of the bellows and the position of the movable output member is not truly representative of the temperature to which the probe is subjected. Furthermore, it will be recognized that the rate of expansion of the liquid filled bellows for a given temperature change at the probe will vary depending upon the temperature effect of the surrounding fluid and the liquid filled bellows. Therefore, in temperature responsive control apparatus of the abovementioned type wherein it is desired to maintain an accurate relationship between the travel of the movable output member and the probe temperature, it becomes necessary to compensate for the effect of the temperature of the fluid surrounding the liquid filled bellows if the movable output member is to assume a specific position for each specific probe temperature.

It is therefore an object of this invention to provide a temperature responsive control apparatus wherein a movable output member is caused to assume a specific position for each specific input temperature applied to the interior of a liquid filled temperature responsive bellows irrespective of temperature changes of a fluid surrounding the liquid filled bellows.

It is an object of this invention to provide temperature responsive control apparatus having a movable output member actuated by a liquid filled bellows as a predetermined function of a variable input temperature signal applied to the liquid filling the bellows irrespective of changes in the temperature variations other than that of the variable input temperature.

It is another object of this invention to provide temperature responsive control apparatus wherein a movable output member is actuated by a pair of liquid filled temperature responsive bellows, one of which is a motor bellows responsive to a variable input temperature signal and the temperature of an environmental fluid and the other of which is a compensating bellows responsive to the temperature of the environmental fluid and operative to compensate for the effect of the environmental fluid temperature on the motor bellows.

It is still another object of this invention to provide novel and improved temperature compensating means for obviating the effect of environmental temperature changes on a liquid filled temperature responsive bellows connected to receive a predetermined input temperature signal and connected to actuate a movable output member.

Other objects and advantages will become apparent in view of the following description taken in conjunction with the accompanying drawings wherein.

Figure 1:
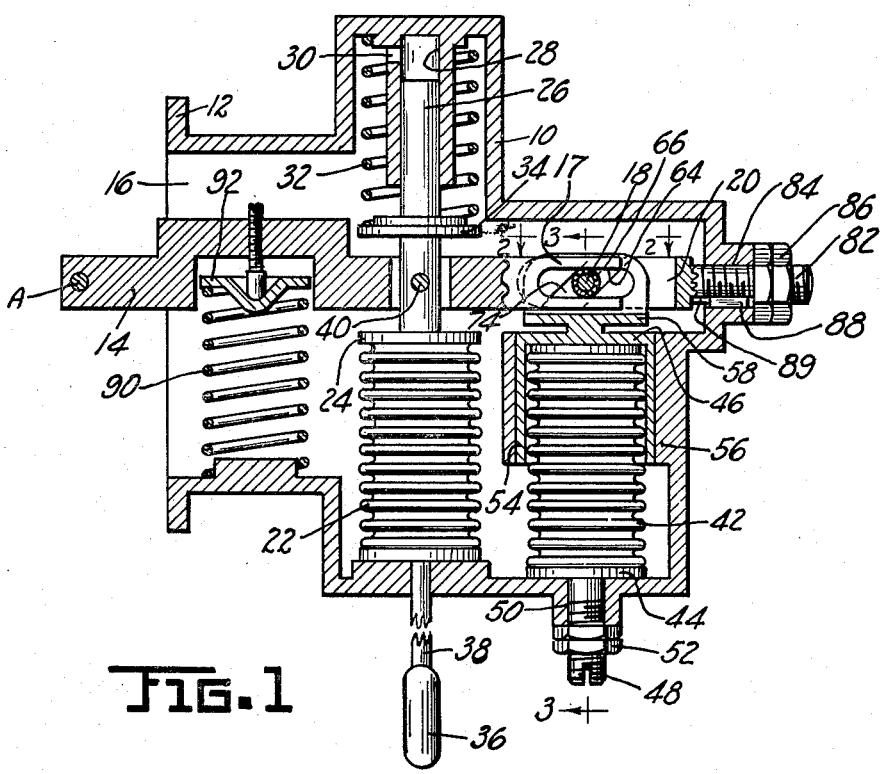
FIGURE 1 illustrates temperature responsive control apparatus embodying the present invention.
Figure 2:
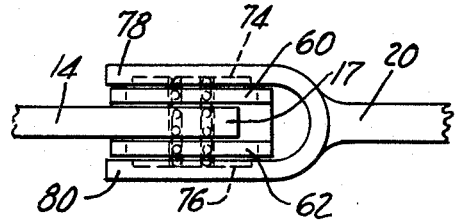
FIGURE 2 is a sectional view taken on line 2—2 of FIGURE 1.
Figure 3:
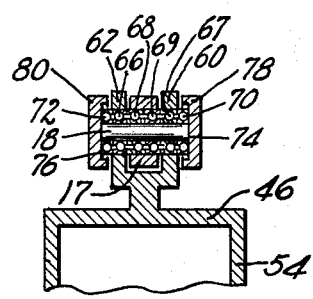
FIGURE 3 is a partial sectional view taken on line 3—3 of FIGURE 1.

Referring to FIGURE 1, numeral 10 indicates a casing provided with a flange 12 by means of which the casing 10 may be secured by any suitable connecting means to a suitable control system, not shown, which responds to movement of the free end of a lever 14 extending through an opening 16 in casing 10. It is apparent that the control system with which the free end of the lever 14 may cooperate can be of any type wherein a mechanical position indicative of a variable input temperature is desired for control purposes. For example, the present invention may be utilized with a fuel control system wherein the interior of the casing 10 is vented to fuel at drain pressure and the lever 14 is arranged to provide an input signal to a servo circuit in the main control system, not shown, or the casing 10 may be attached to a control system wherein the internal air temperature of the casing 10 must be compensated for. In any event, the fluid to which casing 10 is vented may be liquid or air and the present invention will operate equally as well as in either case.

The lever 14 is provided with a slotted end which engages a floating pivot pin 18 carried by an adjustable support member 20. A sealed motor bellows 22 filled with a conventional temperature responsive liquid is fixed at one end to the casing 10 by any suitable means providing a sealed connection. The movable end of the motor bellows 22 is sealed by a cover plate 24 to which one end of a guide rod 26 is fixedly secured. The opposite end of the guide rod is slidably carried in a cylindrical recess 28 formed in casing 10. The recess 28 is vented to the fluid within casing 10 via a passage 30. A spring 32 interposed between casing 10 and a spring retaining member 34 formed on the guide rod 26 serves to compress the motor bellows 22 axially against the liquid within bellows 22. The interior of the motor bellows 22 communicates with a liquid filled temperature probe 36 via a liquid filled capillary tube 38. The operation of the liquid filled motor bellows 22 and liquid filled capillary tube 38 and probe 36 is conventional and will be readily understood by those persons skilled in the art. In short, the probe 36 is located to sense the temperature of some desired medium and, in response to variations in temperature of the medium, the volume of the liquid within bellows 22 varies accordingly which, in turn, causes a variation in the position of the movable end 24 of the motor bellows 22.

The lever 14 is pivoted about pin 18 by the motor bellows 22 which is pivotally connected to lever 14 via guide rod 26 and a pin 40 such that the output or free end of lever 14 is displaced in accordance with the aforementioned movement of the movable end 24 of bellows 22 as a function of the sensed temperature.

The temperature of the fluid surrounding the motor bellows 22 has an adverse effect on the response of the bellows 22 in that, for a given input temperature to the probe 36, the position of the movable end 24 of the bellows will vary depending upon the temperature variations of the surrounding fluid which variations, of course, cause the temperature and thus the volume of the liquid within bellows 22 to vary accordingly which, relative to the probe input temperature, results in a false position vs. probe temperature relationship of the output end of lever 14. Also, the rate of expansion or travel of the motor bellows 22 relative to variations in temperature sensed by probe 36 is caused to vary as a function of the temperature of the fluid surrounding bellows 22. The volume of the liquid within bellows 22 will increase or decrease with a rise or fall, respectively, of the temperature of the surrounding fluid such that, for a given temperature variation at the probe 36, the bellows 22 may expand or travel to a greater or lesser degree depending upon the temperature of the surrounding fluid which, in turn, introduces an error in the position of the lever 14 relative to the temperature variation at the probe 36.

It is apparent that to obtain a specific position of lever 14 for each specific temperature sensed by probe 36 there must be provided apparatus for compensating for the abovementioned temperature effect of the fluid surrounding bellows 22. To this end, the present invention proposes the novel arrangement of a compensating bellows responsive to the temperature of the surrounding fluid and connected to the floating pivot pin 18 to position the same as a function of the temperature of the surrounding fluid and thereby modify the response of lever 14 to movement of the motor bellows 14.

The compensator bellows 42 is sealed at its fixed end by a cover plate 44 and at the opposite movable end by a cup shaped cover plate 46 both of which cover plates are fixedly secured to the bellows 42 by any suitable means providing a sealed connection. The position of cover plate 44 and thus the fixed end of bellows 42 may be adjusted for calibration purposes by a threaded rod 48 fixedly secured to the cover plate 44 and extending therefrom through an opening 50 in casing 10 into threaded engagement with a lock nut 52. The bellows 42 is braced against buckling by the annular portion 54 of cover plate 46 which encompasses the upper portion of bellows 42 and which slides within a tubular guide member 56 fixedly secured to casing 10. A link 58 fixedly secured to cover plate 46 is provided with spaced apart parallel arms 60 and 62 each of which has a slot 64 formed therein through which the floating pivot pin 18 extends. The floating pivot pin 18 is mounted on the inner races of two frictionless bearings 66 and 67. The outer races of bearings 66 and 67 are carried by the slots 64 in arms 60 and 62, respectively, such that for a given position of the link 58 the pivot pin 18 is fixed in position vertically. The slotted end 17 of lever 14 extends between arms 60 and 62 into engagement with the outer races of frictionless bearings 68 and 69, the inner races of which carry the pivot pin 18. The ends of pivot pin 18 are supported by the inner races of frictionless bearings 70 and 72, which ride in milled slots 74 and 76, respectively, formed in opposing surfaces of spaced apart parallel arms 78 and 80 integral with the adjustable support member 20. The outer races of bearings 70 and 72 ride on the inclined walls of milled slots 74 and 76, respectively, which slots extend obliquely across the opposing surfaces of arms 78 and 80. The adjustable support member 20 is provided with a threaded end portion 82 which extends through an opening 84 in casing 10 into engagement with a lock nut 86. The end portion 84 is rotatably fixed by means of a radially extending key member 88 formed thereon which slides in a suitable mating recess 89 formed in casing 10.

A spring 90 interposed between casing 10 and an adjustable spring retaining member 92 suitably carried by lever 14 urges the lever 14 clockwise in FIGURE 1 about pin 40 thereby applying a pre-load against the compensating bellows 42.

*Operation*

It will be assumed initially that the lever 14 is stabilized in a position corresponding to a given temperature at the probe 36. Now, maintaining the probe temperature constant at the given value, a rise in the temperature of the fluid surrounding bellows 22 will effect a corresponding increase in the volume of liquid within bellows 22 which, in turn, urges lever 14 upward whereupon the lever tends to pivot clockwise about pivot pin 18. However, the compensating bellows 42 which is filled with liquid having the same temperature response characteristics as the liquid in bellows 22 also responds to the temperature change of the surrounding fluid and urges the pivot pin 18 upward through a distance proportionally greater than the travel of bellows 22 thereby causing the lever 14 to pivot counterclockwise about pin 40. Of course, the response of motor bellows 22 and compensating bellows 42 to the temperature change occurs simultaneously such that the resulting effect is a counterclockwise pivoting motion of lever 14 about point A at the output end of the lever. To effect this pivoting motion of lever 14 about point A, it is necessary that the volume of the compensator bellows 42 be somewhat greater than that of the motor bellows 22 in order to obtain the proper travel relationship between the two bellows. The travel of the compensator bellows 42 is proportionally greater than the travel of the motor bellows by an amount equal to the ratio of the lever arms from point A to the axes of pins 40 and 18. For example, if the lever arms from point A to the axes of pins 40 and 18 is made two and three inches, respectively, the volume of the compensating bellows 42 must be chosen to provide a travel equal to one and one-half times that of the motor bellows 22 for a given temperature change of the surrounding fluid. Normally, it is desirable to space the pins 40 and 18 as close together as possible to reduce the required travel range of both bellows 22 and 42 in accordance with space limitations imposed by casing 10 and the usual expansion and contraction limits associated with bellows members.

The travel rate of the motor bellows 22 for a given incremental change in probe 36 temperature will vary depending upon the initial temperature and thus volume of the liquid within bellows 22. Higher and lower rates of travel for a given incremental change in probe temperature are experienced at higher and lower initial temperatures, respectively, of the liquid within bellows 22. By varying the effective lever arm from pin 40 to pivot pin 18 as a function of the volume of the compensator bellows 42 the response of lever 14 to motor bellows 22 can be modified to compensate for the abovementioned variations in travel rate of bellows 22. To this end, the pivot pin 18 is restricted to movement along a path defined by the milled slots 74 and 76. Thus, as the pivot pin 18 is urged upwardly by the compensating bellows 42, it rides on bearings 70 and 72 along the inclined walls of the slots 74 and 76, respectively, and moves sideways in the slot 64 away from pin 40 which, in turn, increases the effective lever arm between pin 40 and pivot pin 18 thereby reducing the movement of the output end of lever 14 for a given incremental change in the temperature at probe 36. Obviously, for a decrease in the temperature of the fluid surrounding bellows 22 and 42, the compensator bellows 42 will decrease in volume accordingly in which case the pivot pin 18 will be urged downwardly and towards pin 40 thereby decreasing the effective lever arm between pin 40 and pivot pin 18 to compensate for the lower travel rate of motor bellows 22.

The adjustable feature provided on the support member 20 and compensating bellows 42 permits calibrating the system to obtain the desired response characteristics. The springs 32 and 90 act against lever 14 to impose preloads against motor bellows 22 and compensator bellows 42, respectively.

Conventional fluid seals and access ports to the interior of casing 10 may be provided where required in accordance with established methods known to those skilled in the art.

Although only one embodiment of the present invention has been illustrated and described, it will be apparent to those persons skilled in the art that various changes in the structure and relative arrangement of parts may be made to suit individual requirements without departing from the spirit and scope of the present invention.

I claim:

1. In temperature responsive control apparatus having a positionable output member connected to and actuated by a first variable volume chamber filled with a temperature responsive medium which expands and contracts in response to variations in either of two temperatures to which the chamber is exposed over a relatively wide range of temperature values, said positionable output member being mounted for movement about a pivot member and together with said pivot member defining an effective lever arm through which said first variable volume chamber acts, the combination of a second variable volume chamber filled with a temperature responsive medium responsive to one of said two temperatures and operatively connected to said pivot member for positioning said pivot member as a function of said one of the two temperatures to cause a corresponding variation in said lever arm, said first and second variable volume chambers having a predetermined volumetric expansion relationship whereby said pivot member is displaced by said second variable volume chamber in proportion to the displacement of said positionable output member by said first variable volume chamber in response to a change in said one of the two temperatures to thereby render the output position of said positionable member constant for a given value of the other of said two temperatures irrespective of changes in said one of the two temperatures and to compensate for expansion rate variations of said first variable volume chamber occurring as a result of variations in said one of the two temperatures.

2. In temperature responsive apparatus having a positionable output member connected to and pivotally actuated by a first variable volume chamber filled with a temperature responsive medium which expands and contracts in response to variations in either of two temperatures to which the chamber is exposed over a relatively wide range of temperature values, said positionable output member having an output end and being mounted at the opposite end on a pivot member, the combination of a second variable volume chamber filled with a temperature responsive medium responsive to one of said two temperatures, and means operatively connected to said pivot member and said second variable volume chamber for controlling the position of said pivot and thus the lever arm of said positionable output member through which said first variable volume chamber acts as a function of said one of the two temperatures, said first and second variable volume chambers having a predetermined volumetric expansion relationship in response to a change in said one of the two temperatures whereby said pivot is displaced a distance proportionally greater than the distance through which said positionable output member is displaced by said first variable volume chamber to thereby maintain said output end in a position indicative of a given value of the other of said two temperatures irrespective of the change in said one of the two temperatures and said pivot is disposed toward or away from said output end to effect a corresponding variation in the lever arm through which said first variable volume chamber acts to compensate for expansion rate variations of said first variable volume chamber occurring as a result of variations in said one of the two temperatures.

3. In temperature responsive apparatus having a positionable member pivotally mounted at one end and provided with an opposite output end, a first bellows charged with a temperature responsive medium and exposed to two independently variable temperatures which vary over a relatively wide range of temperature values, said positionable member being pivotally actuated by said first bellows such that the output end is positioned as a function of said two variable temperatures, the combination of a second bellows charged with a temperature responsive medium and exposed to one of said two temperatures, said first and second bellows having a predetermined volumetric expansion relationship in response to a given change in said one of the two temperatures whereby the response of second bellows is proportionally greater than that of said first bellows, means including a displaceable pivot to which one end of said positionable member is pivotally mounted operatively connected to said second bellows, said last named means further including a fixed member having guide means for controlling movement of said pivot toward and away from said output end in response to movement of said second bellows, said second bellows being operative to actuate said displaceable pivot in response to a variation in said one of the two temperatures to thereby compensate for the movement of said positionable member caused by said first bellows in response to said variation in said one of the two temperatures and to effect a variation in the lever arm of said positionable member through which said first bellows acts to compensate for expansion rate variations of said first bellows caused by variations in said one of the two temperatures.

4. In temperature responsive apparatus having a positionable member pivotally mounted at one end and provided with an opposite output end, and a first bellows charged with a temperature responsive medium and exposed to two independently variable temperatures, said positionable member being pivotally actuated by said first bellows such that the output end is positioned as a function of said two independent variable temperatures, the combination of means operatively connected to said positionable member for actuating the same to compensate for the effect of one of said two independent variable temperatures, said means including a second bellows charged with a temperature responsive medium and exposed to said one of the two temperatures, a displaceable pivot to which said one end of the positionable member is pivotally mounted, a fixed support member having slotted portions extending at an angle to the longitudinal axis of said positionable member in which said displaceable pivot is adapted to track, a link operatively connected to said second bellows and said displaceable pivot for actuating the latter along said slotted portions in accordance with the response of said second bellows to said one of the two temperatures to cause a corresponding increase or decrease depending upon the response of said second bellows in the lever arm of said positionable member through which said first bellows acts and thus compensate for expansion rate variations of said first bellows occurring as a result of variations in said one of the two temperatures, said first and second bellows having a predetermined volumetric relationship whereby the response of said second bellows is proportionally greater than that of said first bellows to a given variation of said one of the two temperatures, said positionable member being pivoted about said output end in response to movement of said first and second bellows to thereby maintain said output end in a position indicative of the other of said two temperatures irrespective of said variation in said one of the two temperatures.

5. In a temperature responsive control apparatus having a positionable output member and a variable volume chamber filled with a temperature responsive medium connected to actuate the positionable output member as a function of one of two temperatures to which said chamber is exposed over a relatively wide range of temperature values, the combination of pivot means operatively connected to said positionable output member about which said positionable output member is adapted to pivot in response to volume variations of said variable volume chamber, a second variable volume chamber filled with a temperature responsive medium and exposed to the other of said two temperatures, said second variable volume chamber being operatively connected to said pivot means and operative to modify the position of said pivot means and thus modified the lever arm length of said positionable output member through which said first named variable volume chamber acts to thereby compensate for expansion rate variations of said first named variable volume chamber occurring as a result of variations in said one temperature.

References Cited in the file of this patent
UNITED STATES PATENTS

| | | |
|---|---|---|
| 2,063,613 | McCarthy | Dec. 8, 1936 |
| 2,491,548 | Branson | Dec. 20, 1949 |
| 2,538,824 | Andresen | Jan. 23, 1951 |
| 2,662,757 | Mock | Dec. 15, 1953 |
| 2,929,901 | Bloch | Mar. 22, 1960 |